(12) United States Patent
Fukuoka

(10) Patent No.: US 10,339,224 B2
(45) Date of Patent: Jul. 2, 2019

(54) SPEECH RECOGNITION AND TRANSLATION TERMINAL, METHOD AND NON-TRANSITORY COMPUTER READABLE MEDIUM

(71) Applicant: FUJITSU SOCIAL SCIENCE LABORATORY LIMITED, Kawasaki-shi (JP)

(72) Inventor: Toshikazu Fukuoka, Kawasaki (JP)

(73) Assignee: Fujitsu Social Science Laboratory Limited, Kawasaki-shi (JP)

(*) Notice: Subject to any disclaimer, the term of this patent is extended or adjusted under 35 U.S.C. 154(b) by 0 days.

(21) Appl. No.: 15/473,042

(22) Filed: Mar. 29, 2017

(65) Prior Publication Data

US 2018/0018324 A1 Jan. 18, 2018

(30) Foreign Application Priority Data

Jul. 13, 2016 (JP) .................................. 2016-138919
Dec. 28, 2016 (JP) .................................. 2016-256486

(Continued)

(51) Int. Cl.
*G06F 17/28* (2006.01)
*G10L 15/22* (2006.01)
*G10L 15/26* (2006.01)

(52) U.S. Cl.
CPC .......... *G06F 17/289* (2013.01); *G10L 15/22* (2013.01); *G10L 15/26* (2013.01); *G10L 15/265* (2013.01); *G06F 17/2836* (2013.01)

(58) Field of Classification Search
CPC .... G06F 17/289; G06F 17/28; G06F 17/2836; G10L 15/26; G10L 15/22
See application file for complete search history.

(56) References Cited

U.S. PATENT DOCUMENTS 5,268,839 A  12/1993  Kaji
8,504,375 B2  8/2013  Onishi
(Continued)

FOREIGN PATENT DOCUMENTS

JP  2011-182125 A  9/2011
JP  2014-149644 A  8/2014

OTHER PUBLICATIONS

Office Action issued in related U.S. Appl. No. 15/473,186, dated Feb. 2, 2018.

(Continued)

*Primary Examiner* — Samuel G Neway
(74) *Attorney, Agent, or Firm* — Greer Burns & Crain, Ltd.

(57) ABSTRACT

A terminal equipment comprising: a voice input unit to accept an input of a voice; a speech recognition command unit to command a speech recognition unit to convert voices of joined voice data acquired by the voice input unit joining the voice data of the voice to the voice data of the voice accepted previously into character information of a first language at an interval; a character transmission unit to transmit first character information of the first language toward another terminal equipment whenever receiving the first character information of the first language converted; a translation command unit to command a translation unit to translate second character information of a second language into the first language whenever receiving the second character information of the second language; and a display unit to display the second character information of the first language together with the second character information of the second language.

6 Claims, 9 Drawing Sheets

(30) Foreign Application Priority Data

Dec. 28, 2016 (JP) .................................. 2016-256487
Dec. 28, 2016 (JP) .................................. 2016-256488

(56) References Cited

U.S. PATENT DOCUMENTS

| | | | |
|---|---|---|---|
| 8,818,793 | B1 | 8/2014 | Bangalore et al. |
| 9,318,111 | B2 | 4/2016 | Lee et al. |
| 2006/0173680 | A1 | 8/2006 | Verhasselt et al. |
| 2006/0224378 | A1* | 10/2006 | Chino ................ G06F 17/2785 704/2 |
| 2006/0234680 | A1 | 10/2006 | Doulton |
| 2006/0271350 | A1 | 11/2006 | Chino et al. |
| 2007/0061152 | A1 | 3/2007 | Doi |
| 2007/0100635 | A1 | 5/2007 | Mahajan et al. |
| 2007/0225973 | A1 | 9/2007 | Childress et al. |
| 2007/0225975 | A1* | 9/2007 | Imoto ................ G10L 15/065 704/233 |
| 2007/0265825 | A1 | 11/2007 | Cancedda et al. |
| 2008/0262827 | A1 | 10/2008 | DeGroot |
| 2010/0217582 | A1 | 8/2010 | Waibel et al. |
| 2011/0213607 | A1* | 9/2011 | Onishi ................ H04N 7/147 704/2 |
| 2012/0078609 | A1* | 3/2012 | Chaturvedi ........... G06F 17/289 704/3 |
| 2013/0124984 | A1 | 5/2013 | Kuspa |
| 2014/0156256 | A1 | 6/2014 | Kim et al. |
| 2014/0156279 | A1 | 6/2014 | Okamoto et al. |
| 2014/0214426 | A1 | 7/2014 | Kanevsky et al. |
| 2014/0242955 | A1* | 8/2014 | Kang ................... G06F 17/289 455/414.1 |
| 2014/0303961 | A1 | 10/2014 | Leydon et al. |
| 2014/0316776 | A1 | 10/2014 | Lee et al. |
| 2015/0254238 | A1 | 9/2015 | Waibel et al. |
| 2015/0269857 | A1 | 9/2015 | Feng |
| 2016/0066055 | A1* | 3/2016 | Nir ......................... G10L 15/05 725/35 |
| 2016/0092438 | A1 | 3/2016 | Sonoo |
| 2018/0270350 | A1 | 9/2018 | Engelke et al. |

OTHER PUBLICATIONS

Toshikazu Fukuoka et al.; U.S. Appl. No. 15/473,186 filed Mar. 29, 2017.

Office Action issued in related U.S. Appl. No. 15/473,186, dated Jul. 31, 2018.

Office Action dated Mar. 28, 2019 in the related U.S. Appl. No. 15/473,186.

\* cited by examiner

SPEECH RECOGNITION AND TRANSLATION TERMINAL, METHOD AND NON-TRANSITORY COMPUTER READABLE MEDIUM

CROSS-REFERENCE TO RELATED APPLICATION

This application is based upon and claims the benefit of priority of the prior Japanese Patent Applications No. 2016-138919 filed on Jul. 13, 2016, No. 2016-256486 filed on Dec. 28, 2016, No. 2016-256487 filed on Dec. 28, 2016, and No. 2016-256488 filed on Dec. 28, 2016, the entire contents of which are incorporated herein by reference.

TECHNICAL FIELD

The present invention pertains to a terminal equipment, a translation method, and a non-transitory computer readable medium.

BACKGROUND ART

A translation apparatus exists, which inputs a speech of a certain language uttered by a user and translates the inputted speech into a speech of a different language.

DOCUMENTS OF PRIOR ARTS

Patent Documents

[Patent Document 1] Japanese Patent Application Laid-Open Publication No. 2011-182125
[Patent Document 2] Japanese Patent Application Laid-Open Publication No. 2014-149644

SUMMARY OF THE INVENTION

Each of the conventional translation apparatuses has, however, a hindrance against conversing with another user via the translation apparatus due to a large time lag till starting the translation since the user has uttered the speech.

It is an object of the present invention to provide a technology of further smoothening a conversation between users using different languages.

A solution of the problem described above involves adopting the following means.

To be specific, according to a first aspect, a terminal equipment includes:

a voice input unit to accept an input of a voice;

a speech recognition command unit to command a speech recognition unit to convert voices of joined voice data acquired by the voice input unit joining the voice data of the voice accepted by the voice input unit to the voice data of the voice accepted previously into character information of a first language at an interval of predetermined time;

a character transmission unit to transmit first character information of the first language toward another terminal equipment whenever receiving the first character information of the first language converted by the speech recognition unit;

a translation command unit to command a translation unit to translate second character information of a second language into the first language whenever receiving the second character information of the second language from another terminal equipment; and a display unit to display the second character information of the first language translated by the translation unit together with the second character information of the second language.

The aspect of the disclosure may be attained such that an information processing apparatus runs a program. To be specific, processes executed by respective means according to the aspect described above can be specified by way of a program to be run by the information processing apparatus, or by way of a non-transitory computer readable recording medium recorded with this program. A configuration of the disclosure may also be specified as a method by which the information processing apparatus executes the processes to be executed by the respective means described above. The configuration of the disclosure may further be specified as a system including the information processing apparatus that executes the processes to be executed by the respective means described above.

The present invention aims at providing the technology of further smoothening the conversation between the users using the different languages.

DESCRIPTION OF EMBODIMENTS

An embodiment will hereinafter be described with reference to the drawings. A configuration of the embodiment is an exemplification, and a configuration of the invention is not limited to the specific configuration of the embodiment of the disclosure. The specific configuration corresponding to the embodiment may be properly adopted on the occasion of carrying out the invention.

Embodiment

A translation system of the present embodiment displays speech (phonemes of words, phrases and other equivalents) uttered by a user toward a terminal equipment on a terminal equipment of another user, translates the uttered speech into another speech of a language (e.g., Japanese, English, Spanish and other languages) used by another user, and displays the translated speech. In the translation system according to the embodiment, the terminal equipment accepts an input of voice uttered by the user, and transmits voice data of the inputted voice to a speech recognition apparatus. The speech recognition apparatus converts the voice data into character information, and outputs the converted character information to the terminal equipment. The terminal equipment transmits the character information together with language information specifying a language of the character information toward another predetermined terminal equipment. The terminal equipment, upon receiving the language information and the character information, displays the character information, and transmits the language information/character information and another language information specifying a language after being translated (post-translating language) to a translation apparatus. The translation apparatus translates the character information into a second language from a first language when receiving the character information, the character information specifying the language (the first language) of the character information and the language information specifying the post-translating language, and transmits the post-translating character information to the terminal equipment. The terminal equipment, upon receiving the post-translating character information, displays this character information.

Example of Configuration

Figure 1:
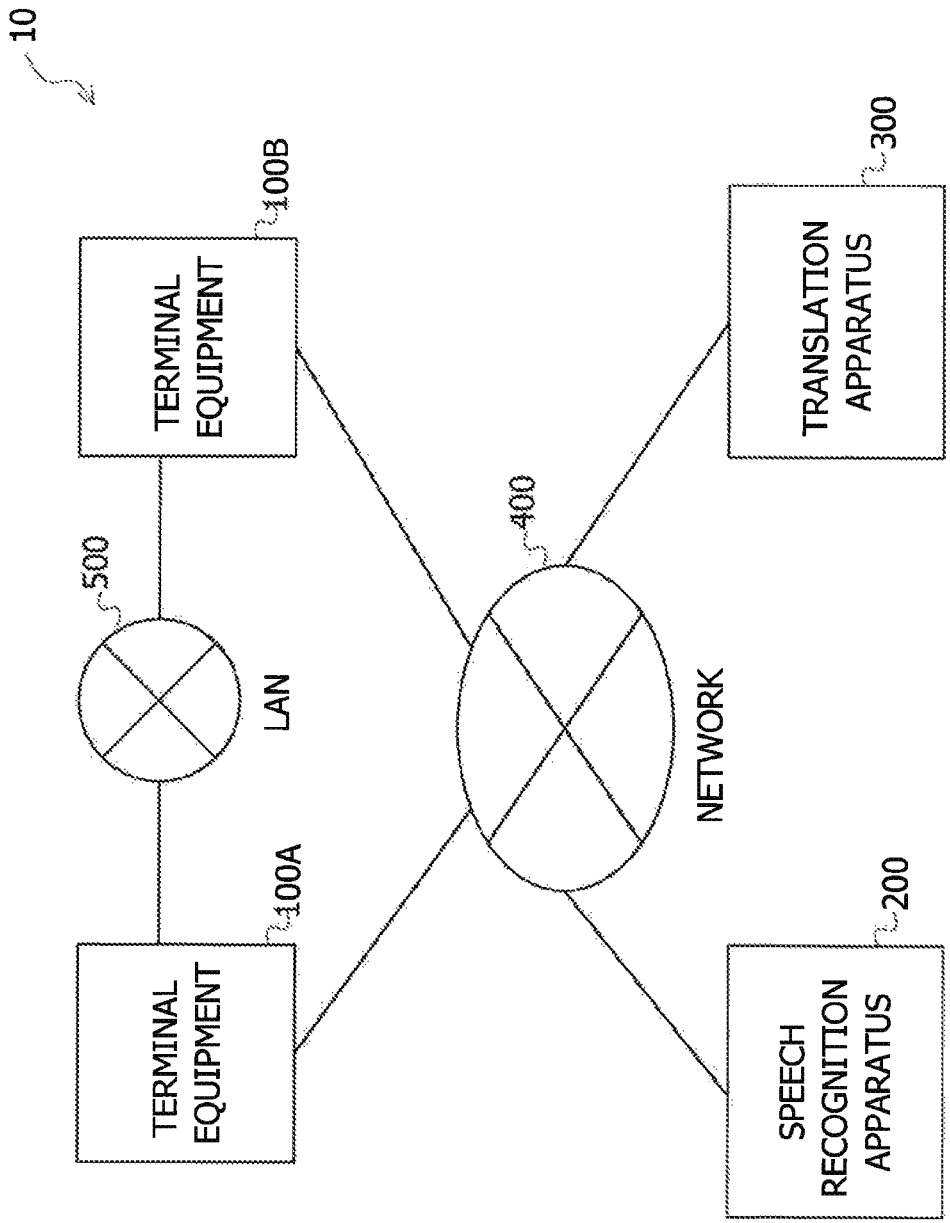
FIG. 1 is a diagram illustrating an example of a configuration of a translation system according to an embodiment.

FIG. 1 is a diagram illustrating an example of a configuration of the translation system according to the embodiment. A translation system 10 in FIG. 1 includes, a terminal equipment 100A, a terminal equipment 100B, a speech recognition apparatus 200, a translation apparatus 300, a network 400, and a LAN (Local Area Network) 500. The terminal equipment 100A is connected to the network 400 and the LAN 500. The terminal equipment 100B is connected also to the network 400 and the LAN 500. The terminal equipments 100A and 100B have the same configuration. The terminal equipments 100A and 100B will be simply called the terminal equipments 100 unless otherwise distinguished. The speech recognition apparatus 200 converts the inputted voice data into the character information, and outputs the converted character information. The translation apparatus 300 translates the inputted character information of the first language into the character information of the second language different from the first language, and outputs the translated character information. The network 400 is a network instanced by the Internet to which the terminal equipment 100, the speech recognition apparatus 200, the translation apparatus 300 and other equivalent apparatuses are connected. The LAN 500 is a local area network to which the terminal equipments 100A and 100B are connected. The LAN 500 may cover a router. The terminal equipments 100A and 100B may also be connected to the network 400 via the LAN 500. A number of the terminal equipments of the system 10 in FIG. 1 is "2" but is not limited to "2".

The terminal equipment 100 accepts the input of the voice uttered by the user, converts the voice into the voice data, and transmits the converted voice data to the speech recognition apparatus 200. The language (usage language) used by the user of the terminal equipment 100 is previously registered in the terminal equipment 100. The usage language may also be a language contained in parameters to be set in an Operating System (OS) running on the terminal equipment 100. The terminal equipment 100 transmits information of the usage language together with the voice data to the speech recognition apparatus 200. The terminal equipment 100 receives post-converting character information from the speech recognition apparatus 200. The terminal equipment 100 transmits the received character information together with the information of the usage language toward another terminal equipment 100. The terminal equipment 100, upon receiving the information of the usage language and the character information from another terminal equipment 100, displays this character information. The terminal equipment 100 transmits the information of the usage language, the character information and the information of the usage language of the self-equipment to the translation apparatus 300. The terminal equipment 100, when receiving the post-translating character information from the translation apparatus 300, displays this character information. A configuration of the terminal equipment 100 will be described later on.

The speech recognition apparatus 200 accepts the information of the usage language of the terminal equipment 100 and the speech recognition apparatus 200 from this terminal equipment 100, converts the voice of the voice data into the character information of the usage language, and transmits the converted character information to the terminal equipment 100. The speech recognition apparatus 200, when the voice contains silence continuing for a predetermined period of time, may convert this voice into a control character indicating a line feed. The speech recognition apparatus 200 buffers the voice data transmitted from the terminal equipment 100, and may convert the speech of a series of buffered voice data into a series of character information. The speech recognition apparatus 200, when converting the voice into the character information containing the control character indicating the line feed, may delete the voice data before the voice data corresponding to the control character from the buffer. The speech recognition apparatus 200 is thereby set to invariably convert the voice data from the line feed onward into the character information. A known speech recognition means may be used as the speech recognition apparatus 200.

The translation apparatus 300 accepts the information of the first language, the character information and the information of the second language from the terminal equipment 100. The translation apparatus 300 translates the character information into the second language from the first language. The translation apparatus 300 transmits the translated character information to the terminal equipment 100. A known translation means may be used as the translation apparatus 300.

<Configuration of Terminal Equipment>

Figure 2:
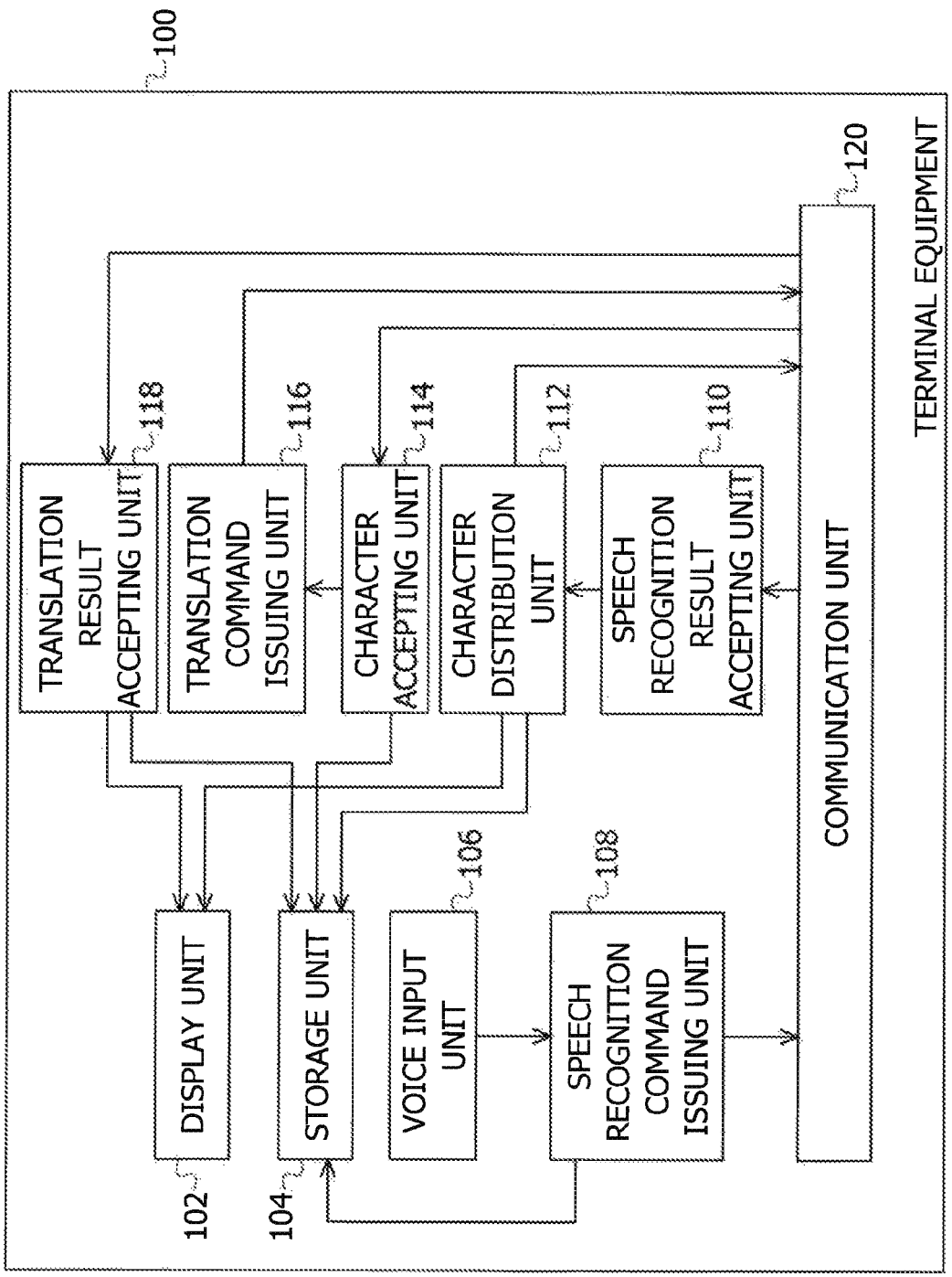
FIG. 2 is a diagram illustrating an example of function blocks of a terminal equipment.

FIG. 2 is a diagram illustrating an example of function blocks of the terminal equipment. The terminal equipment 100 in FIG. 2 includes a display unit 102, a storage unit 104, a voice input unit 106, a speech recognition command issuing unit 108, a speech recognition result accepting unit 110, a character distribution unit 112, a character accepting unit 114, a translation command issuing unit 116, a translation result accepting unit 118, and a communication unit 120.

The display unit 102 displays the information to the user of the terminal equipment 100. The display unit 102 displays the character information to be transmitted toward another terminal equipment 100 via the character distribution unit 112, and the character information as a translation result to be received by the translation result accepting unit 118.

The storage unit 104 stores the data used in the terminal equipment 100, the information of the language (usage language) used by the user of the terminal equipment 100, the character information received from other apparatuses, the voice data and other equivalent information. The storage unit 104 is capable of storing pieces of identifying information of the self-equipment and other equipments, and addresses on the network.

The voice input unit 106 accepts the input of the voice uttered by the user of the terminal equipment 100 by an input means instanced by a microphone. The voice input unit 106 converts the inputted voice into electric signals, and outputs the signals as the voice data to the speech recognition command issuing unit 108. The voice input unit 106 transmits the voice data at an interval of predetermined time.

The speech recognition command issuing unit 108 receives the voice data from the voice input unit 106. The speech recognition command issuing unit 108 stores the received voice data in the storage unit 104. The speech recognition command issuing unit 108 acquires, from the storage unit 104, the information of the usage language registered as the language used by the user of the terminal equipment 100. The speech recognition command issuing unit 108 generates a speech recognition command for causing the speech recognition apparatus 200 to recognize the voice, and transmits the generated command to the speech recognition apparatus 200 via the communication unit 120. The speech recognition command is transmitted to the speech recognition apparatus 200 via the network from the communication unit 120. The voice data and the information of the usage language are also transmitted together with the speech recognition command. The speech recognition command is a command for commanding the speech recognition apparatus 200 to convert the voice data into the character information of the usage language. The speech recognition command issuing unit 108 is one example of a "speech recognition command unit".

The speech recognition result accepting unit 110 receives a result of speech recognition by the speech recognition apparatus 200 via the communication unit 120. The speech recognition result accepting unit 110 transmits the received speech recognition result to the character distribution unit 112.

The character distribution unit 112 receives the speech recognition result from the speech recognition result accepting unit 110. The character distribution unit 112 stores the received speech recognition result in the storage unit 104. The character distribution unit 112 causes the display unit 102 to display the received speech recognition result. The character distribution unit 112 acquires the information of the usage language of the terminal equipment 100 from the storage unit 104. The character distribution unit 112 transmits the received speech recognition result and the acquired information of the usage language by a multicast communication (multicasting) toward another terminal equipment on the LAN 500 via the communication unit 120. The character distribution unit 112 is one example of a "character transmission unit".

The character accepting unit 114 receives the speech recognition result and the information of the usage language from another terminal equipment 100 via the communication unit 120. The character accepting unit 114 stores the received speech recognition result and the information of the usage language in the storage unit 104. The character accepting unit 114 acquires the information of the usage language of the self terminal equipment 100 from the storage unit 104. The character accepting unit 114, when the usage language of the self-equipment is different from the received usage language, transmits the information of the usage language of the self-equipment, the received information of the usage language and the speech recognition result to the translation command issuing unit 116.

The translation command issuing unit 116 receives, from the character accepting unit 114, the speech recognition result, the information of the usage language (the first language) of another terminal equipment 100 and the information of the usage language (the second language) of the self terminal equipment 100. The translation command issuing unit 116 generates the translation command for commanding the translation apparatus 300 to translate, and transmits the generated command to the translation apparatus 300 via the communication unit 120. The translation command contains the speech recognition result, the information of the first language, and the information of the second language. The translation command is the command for commanding the translation apparatus 300 to translate the speech recognition result defined as the character information of the first language into the second language. The translation command issuing unit 116 is one example of a "translation command unit".

The translation result accepting unit 118 receives a translation result by the translation apparatus 300 via the communication unit 120. The translation result accepting unit 118 stores the received translation result in the storage unit 104. The translation result accepting unit 118 causes the display unit 102 to display the received translation result.

The communication unit 120 transmits and receives the data to and from another equipment and other equivalent equipments. The communication unit 120 transmits a predetermined command to the speech recognition apparatus 200 and the translation apparatus 300 via the network 400. The communication unit 120 receives predetermined results from the speech recognition apparatus 200 and the translation apparatus 300. The communication unit 120 transmits the character information and other equivalent information by the multicast communication toward another terminal equipment 100 on the LAN 500. The communication unit 120 receives the character information and other equivalent information transmitted by the multicast communication from another terminal equipment 100. The multicast communication is one of packet transmission methods, and enables packets (data) to be multicasted to one or more pre-designated terminal equipments. The data communication method toward another terminal equipment 100 is not limited to the multicast communication, and may involve using other communication methods. In the multicast communication, the terminal equipments are designated such that, e.g., the terminal equipment 100 requests the router on the LAN 500 to transmit the data by the multicast communication with the data being delivered to predetermined addresses. The terminal equipments 100 can receive the data delivered to the predetermined addresses as designated above from the router. The terminal equipment 100 can also deliver the data based on the multicast communication by transmitting the data to the predetermined addresses.

<Hardware Configuration of Equipment>

The terminal equipment 100 can be attained by using a dedicated or general-purpose computer instanced by a smartphone, a mobile phone, a tablet-type device, a car navigation system, a PDA (Personal Digital Assistant) and a PC (Personal Computer), or an electronic equipment mounted with the computer. Each of the speech recognition apparatus 200 and the translation apparatus 300 can be attained by using a dedicated or general-purpose computer instanced by the PC and a workstation (WS), or the electronic equipment mounted with the computer. The terminal equipment 100 may include the speech recognition apparatus 200 and the translation apparatus 300.

Figure 3:
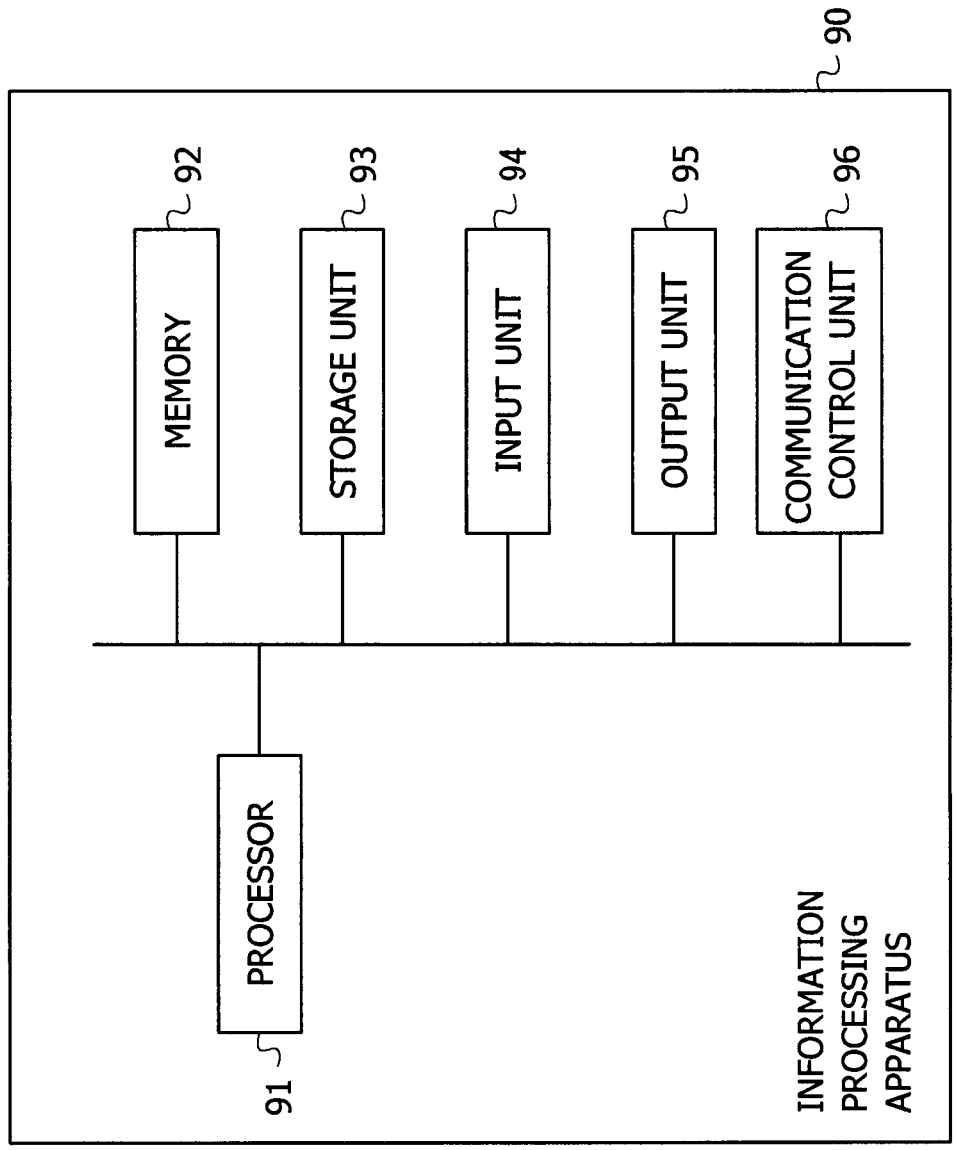
FIG. 3 is a diagram illustrating an example of a hardware configuration of an information processing apparatus.

FIG. 3 is a diagram illustrating an example of a hardware configuration of an information processing apparatus. An information processing apparatus 90 illustrated in FIG. 3 has a configuration of a general type of computer. Each of a control apparatus 20, the terminal equipment 100, the speech recognition apparatus 200 and the translation apparatus 300 is attained by the information processing apparatus 90 as depicted in FIG. 3. The information processing apparatus 90 includes a processor 91, a memory 92, a storage unit 93, an input unit 94, an output unit 95, and a communication control unit 96. These components are interconnected via a bus. The memory 92 and the storage unit 93 are non-transitory computer readable recording mediums. The hardware configuration of the information processing apparatus is not limited to the configuration illustrated in FIG. 3, and the components may also be properly omitted, replaced and added.

The processor 91 loads a program stored on the recording medium onto a work area of the memory 92 and runs the program, and the respective constructive units are controlled through running the program, whereby the information processing apparatus 90 can attain functions matching with predetermined purposes.

The processor 91 is exemplified by a CPU (Central Processing Unit) and a DSP (Digital Signal Processor).

The memory 92 includes, e.g., a RAM (Random Access Memory) and a ROM (Read Only Memory). The memory 92 is also called a main storage device.

The storage unit 93 is exemplified by, an EPROM (Erasable Programmable ROM), a Hard Disk Drive (HDD), and a Solid State Drive (SSD). The storage unit 93 can include a removable medium, i.e., a portable recording medium. The removable medium is a USB (Universal Serial Bus) memory, or a disc recording medium instanced by a CD (compact Disc) and a DVD (Digital Versatile Disc). The storage unit 93 is also called a secondary storage device.

The storage unit 93 stores various categories of programs, various items of data and various types of tables on the recording medium in a readable/writable manner. The storage unit 93 stores an Operating System (OS), the various categories of programs and the various types of tables. The information to be stored on the storage unit 93 may also be stored on the memory 92.

The Operating System (OS) is defined as software acting as an intermediary between software (programs) and hardware, and managing a memory space, files, processes and tasks. The OS includes a communication interface. The communication interface is a program for transferring and receiving the data to and from other external apparatuses connected via the communication control unit 96. The external apparatuses encompass, e.g., other information processing apparatuses and external storage devices.

The input unit 94 includes a keyboard, a pointing device, a wireless remote controller, a touch panel and other equivalent devices. The input unit 94 can include a video/picture input device like a camera (digital camera), and a voice/sound input device like a microphone.

The output unit 95 includes a display device instanced by a CRT (Cathode Ray Tube) display, an LCD (Liquid Crystal Display), a PDP (Plasma Display Panel), and an EL (Electroluminescence) panel, and an output device instanced by a printer. The output unit 95 can include a voice/sound output device instanced by a loudspeaker.

The communication control unit 96 connects with other apparatuses, and controls the communications between the information processing apparatus 90 and other apparatuses. The communication control unit 96 is, e.g., a LAN (Local Area Network) interface board, a wireless communication circuit for wireless communications instanced by Bluetooth (registered trademark), and a communication circuit for telephone communications. The LAN interface board and the wireless communication circuit are connected to the network instanced by the Internet.

The processor loads the program stored on the secondary storage device onto the main storage device and runs the program, and the computer configured to attain each of the terminal equipment 100, the speech recognition apparatus 200 and the translation apparatus 300 is thereby enabled to attain the respective functions. The storage unit of each apparatus is provided in a storage area of the main storage device or the secondary storage device.

Steps of writing the program contain, as a matter of course, processes to be executed in time-series along a described sequence, and processes to be executed in parallel or individually even when not necessarily processed in time-series. Part of the steps of writing the program may be omitted.

Operational Example

An operational example of the terminal equipment 100 will be described. Operations of the terminal equipment 100 will herein be described by being separated into an operation flow of inputting the voice and an operation flow of displaying a translated sentence, and are executed in parallel on the terminal equipment 100. Applications for attaining these operations are run on the terminal equipment 100.

The terminal equipment 100 is preset to enable the transmission and reception of the data based on the multicast communication using predetermined addresses. One or more terminal equipments 100 capable of transmitting and receiving the data based on the multicast communication are connected to the LAN 500. The terminal equipment 100 may also be set to enable the transmission and reception of the data based on the multicast communication using predetermined addresses by running the applications for attaining the operations described above on the terminal equipment 100.

<Input of Voice>

Figure 4:
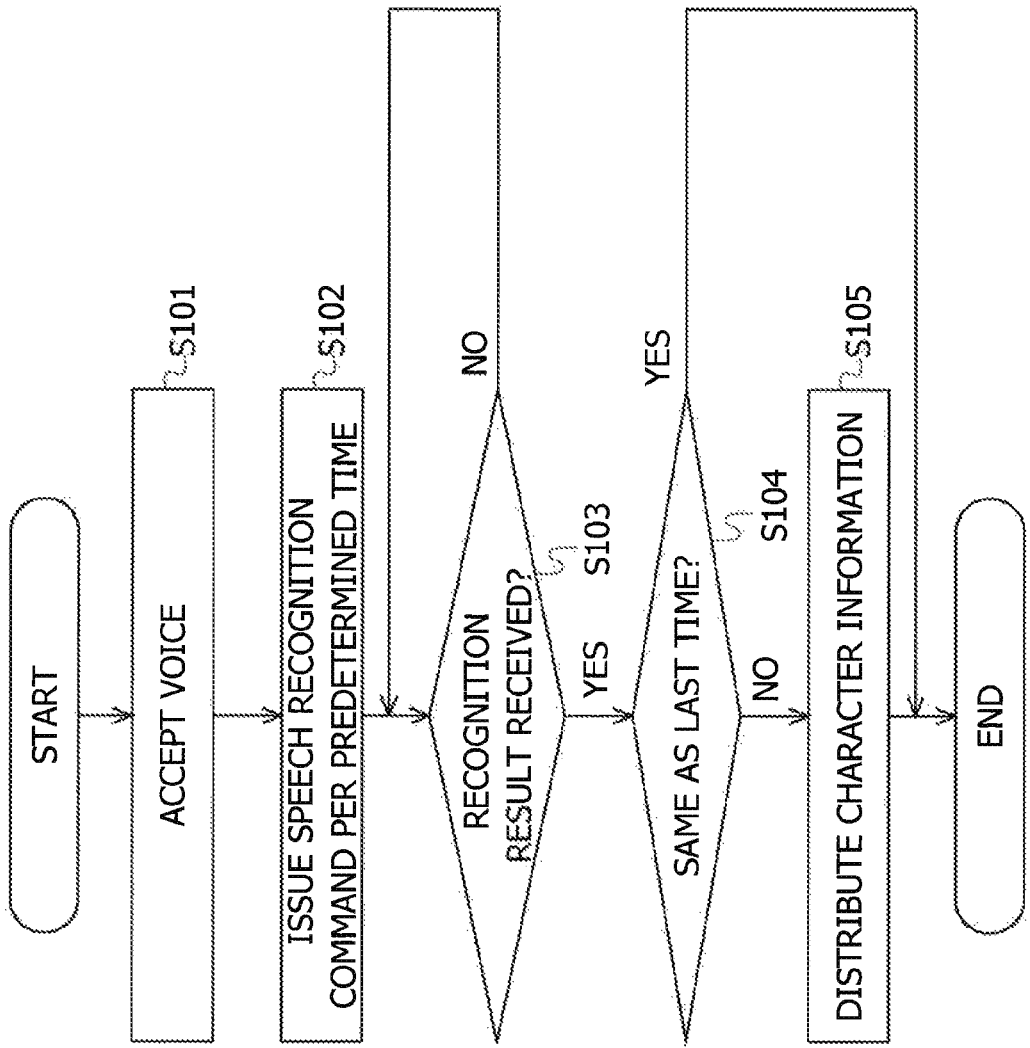
FIG. 4 is a flowchart illustrating an example of an operation flow of inputting a voice to the terminal equipment.

FIG. 4 is a flowchart illustrating an example of the operation flow of inputting the voice on the terminal equipment. The terminal equipment 100 is used by the user. The user inputs the voice by making utterance toward the terminal equipment 100. For example, the operation flow in FIG. 4 is executed at the interval of predetermined time (e.g., 200 ms) equivalent to a length of one section of the voice input.

In S101, the voice input unit 106 of the terminal equipment 100 accepts the input of the voice uttered by the user of the terminal equipment 100. The voice input unit 106 converts the inputted voice into the electric signals, and transmits the signals as the voice data to the speech recognition command issuing unit 108. The voice input unit 106 transmits the voice data at the interval of the predetermined time (e.g., per 200 ms). As the predetermined time becomes shorter, a time lag between the utterance and the display of the translated sentence can be made shorter, and there is, however, an increased processing quantity of each of the terminal equipment 100 and the speech recognition apparatus 200. It is desirable that the predetermined time is set as short as a length of one phonic element and one word of the utterance. This is because it is difficult to convert the voice shorter than one phonic element and one word into the character information.

In S102, the speech recognition command issuing unit 108 receives the voice data from the voice input unit 106 at the interval of the predetermined time. The speech recognition command issuing unit 108 stores the received voice data in the storage unit 104. The speech recognition command issuing unit 108 acquires, from the storage unit 104, the information of the usage language registered as the language used by the user of the terminal equipment 100. The speech recognition command issuing unit 108 generates (issues) the speech recognition command for commanding the speech recognition apparatus 200 to recognize the voice, and transmits the generated command to the speech recognition apparatus 200 via the communication unit 120. A speech recognition process is a process of converting the voice data into the character information of the predetermined language, based on data structured to previously associate the voices with the characters of the predetermined language. The speech recognition command is transmitted to the speech recognition apparatus 200 from the communication unit 120 via the network 400. The speech recognition command is a command for commanding the speech recognition apparatus 200 to convert the voice data into the character information of the usage language. The voice data and the information of the usage language are transmitted together with the speech recognition command. The voice data may contain a series of serial numbers. An address of the terminal equipment 100 and an identifier for identifying the terminal equipment 100 may also be transmitted together with the speech recognition command.

The speech recognition apparatus 200, upon receiving the speech recognition command from the terminal equipment 100, converts the voice of the voice data into the characters of the usage language transmitted together with the speech recognition command according to this speech recognition command, and transmits the converted characters as a result of the voice recognition to the terminal equipment 100. The speech recognition apparatus 200, when the voice contains the silence continuing for the predetermined time, converts this voice into the control character indicating the line feed. The speech recognition apparatus 200 buffers the voice data transmitted from the terminal equipment 100, generates one set of joined voice data by joining a series of buffered voice data, and converts the voices of the joined voice data into a series of character information. The speech recognition apparatus 200, when generating one set of speech data, may generate the speech data so as not to replace a sequential order by using the serial numbers contained in the voice data. The speech recognition apparatus 200, when converting the voice into the character information containing the control character indicating the line feed, deletes the voice data before the voice data corresponding to the control character from the buffer. It therefore follows that the speech recognition apparatus 200 invariably converts the voice data from the silence (line feed) onward into the character information. The speech recognition command may contain a command for recognizing the voice by joining the series of already-transmitted voice data into one set of voice data, and a command for deleting the data in the buffer after recognizing the voice when the voice data contains the silence equal to or longer than the predetermined time.

In S103, the speech recognition result accepting unit 110 determines whether the result of the voice recognition by the speech recognition apparatus 200 in response to the speech recognition command transmitted in S102 is received or not. When receiving the result of the voice recognition (S103; YES), the processing advances to S104. Whereas when not receiving the result of the voice recognition (S103; NO), the process in S103 is repeated.

In S104, the speech recognition result accepting unit 110 compares the speech recognition result received this time with the speech recognition result received last time to be stored in the storage unit 104. When the speech recognition result received this time is the same as the speech recognition result received last time (S104; YES), the processing of this operation flow is finished. This is because the process in S105 is executed for the speech recognition result of the last time in this case, and hence there is no necessity for executing the same process for the same speech recognition result. The same is applied to a case of the speech recognition result not containing the character information. It is because there is no necessity for executing the subsequent processes instanced by displaying when not containing the character information. Whereas when the speech recognition result received this time is different from the speech recognition result received last time (S104; NO), the speech recognition result accepting unit 110 transmits the speech recognition result to the character distribution unit 112, and the processing advances to S105.

In S105, the character distribution unit 112 receives the speech recognition from the speech recognition result accepting unit 110. The character distribution unit 112 stores the received speech recognition result as the speech recognition result of this time in the storage unit 104. Hereafter, when a speech recognition result is newly stored, the speech recognition result of this time becomes the speech recognition result of the last time. The character distribution unit 112 causes the display unit 102 to display the received speech recognition result. Hereat, the character distribution unit 112, after erasing the speech recognition result displayed finally, displays the character information of the speech recognition result received this time. In other words, the speech recognition result to be displayed is updated. However, the character distribution unit 112, when the speech recognition result displayed finally contains the control character indicating the line feed, displays the character information of the speech recognition result received this time after performing the line feed without erasing the speech recognition result displayed finally. The speech recognition result contains the control character indicating the line feed, thereby establishing the speech recognition result with respect to the series of speech data. The character distribution unit 112 acquires the information of the usage language of the terminal equipment 100 from the storage unit 104. The character distribution unit 112 transmits, based on the multicast communication, the received speech recognition result and the acquired information of the usage language toward other terminal equipments on the LAN 500 via the communication unit 120 by designating predetermined addresses. The usage language concerned is the language of the character information of the speech recognition result.

Herein, the character distribution unit 112 causes the display unit 102 to display the received speech recognition result, but may not cause the display unit 102 to display the received speech recognition result. The speech recognition result transmitted based on the multicast communication by the terminal equipment 100 is also distributed to the self terminal equipment 100. This is because even when the character distribution unit 112 does not cause the display unit 102 to display, the character accepting unit 114 to be described later on can cause the display unit 102 to display the speech recognition result distributed based on the multicast communication.

<Display of Translated Sentence>

Figure 5:
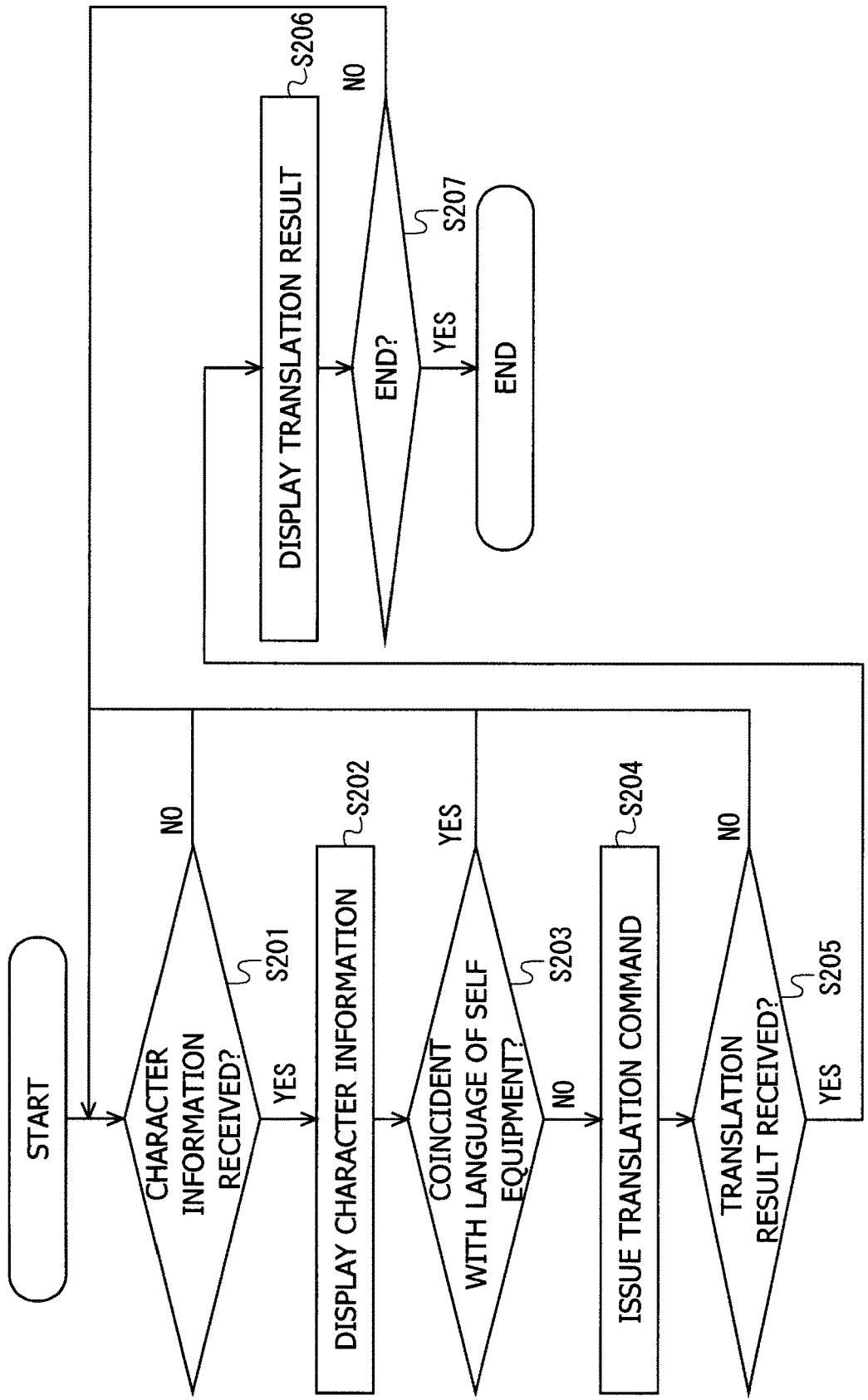
FIG. 5 is a flowchart illustrating an example of an operation flow of displaying a translated sentence on the terminal equipment.

FIG. 5 is a flowchart illustrating an example of an operation flow of displaying the translated sentence on the terminal equipment. The terminal equipment 100 is used by the user.

In S201, the character accepting unit 114 of the terminal equipment 100 determines whether the speech recognition result (the character information) from each of other terminal equipments 100 and the information of the usage language is received based on the multicast communication via the communication unit 120. When received (S201; YES), the processing advances to S202. Whereas when not received, (S202; NO), the process in S201 is iterated.

In S202, the character accepting unit 114 stores the received character information and the information of the usage language in the storage unit 104. The character accepting unit 114 causes the display unit 102 to display the received character information. Hereat, the character accepting unit 114 displays the character information received this time after erasing the character information displayed finally in S202. In other words, the character information to be displayed is updated. However, the character accepting unit 114, when the character information displayed finally in S202 contains the control character indicating the line feed, displays the character information received this time after performing the line feed without erasing the character information displayed finally. When the character information contains the control character indicating the line feed, the character information to be displayed is not updated.

In S203, the character accepting unit 114 acquires the information of the usage language of the self terminal equipment 100 from the storage unit 104. The character accepting unit 114 determines whether the usage language of the self terminal equipment 100 is coincident with the usage language received in S201. When the usage language of the self terminal equipment 100 is coincident with the usage language received in S201 (S203; YES), the processing loops back to S201. In this case, the received character information is not translated. Whereas when the usage language of the self terminal equipment 100 is different from the usage language received in S201 (S203; NO), the processing advances to S204.

In S204, the character accepting unit 114 transmits the information of the usage language of the self terminal equipment 100, the received information of the usage language and the character information (the speech recognition result) to the translation command issuing unit 116. The translation command issuing unit 116 receives, from the character accepting unit 114, the received speech recognition result, the received information of the usage language (the first language) and the information of the usage language (the second language) of the self terminal equipment 100. The translation command issuing unit 116 generates (issues) a translation command for commanding the translation apparatus 300 to translate, and transmits the generated translation command to the translation apparatus 300 via the communication unit 120. A translation process is a process of converting (translating) the character information of the first language into the character of the second language. The translation command is transmitted to the translation apparatus 300 from the communication unit 120 via the network 400. The translation command is a command of commanding the translation apparatus 300 to translate the character information of the first language into the character information of the second language. The information of the first language, the character information, and the information of the second language are transmitted together with the translation command. An address of the terminal equipment 100 and an identifier for identifying the terminal equipment 100 may also be transmitted together with the translation command.

The translation apparatus 300 accepts the translation command, the information of the first language, the character information and the information of the second language from the terminal equipment 100. The translation apparatus 300, upon receiving the translation command, translates the character information of the first language into the second language according to the translation command. The translation apparatus 300 transmits the translated character information to the terminal equipment 100. The translation apparatus 300, when the character information contains the control character indicating the line feed, sets the post-translating character information to contain the control character.

In S205, the translation result accepting unit 118 determines whether a translation result is received from the translation apparatus 300 via the communication unit 120. When received (S205; YES), the processing advances to S206. Whereas when not received (S205; NO), the processing loops back to S201.

In S206, the translation result accepting unit 118 stores the received translation result in the storage unit 104. The translation result accepting unit 118 causes the display unit 102 to display the received translation result. The translation result is displayed in the vicinity of the character information displayed in S202. Displaying in the vicinity thereof facilitates a comparison between the translation result and the pre-translating character information, which comparison is made by the user of the terminal equipment 100. Hereat, the translation result accepting unit 118 displays the translation result received this time after erasing the translation result displayed finally in S206. In other words, the translation result to be displayed is updated. However, the translation result accepting unit 118, when the translation result displayed finally in S206 contains the control character indicating the line feed, displays the translation result received this time after performing the line feed without erasing the translation result displayed finally. When the character information contains the control character indicating the line feed, the character information to be displayed is not updated. An icon (instanced by a pictorial icon) specifying the user uttering the voice serving as a basis of the character information may be displayed in the vicinity of the character information to be displayed. This contrivance facilitates recognizing which user utters which character information.

In S207, in an application for attaining an operation of the present operation flow, the terminal equipment 100 determines whether an end of the application is selected. The end of the application includes power-OFF of the self terminal equipment 100. When the end is selected (S207; YES), the processing of the operation flow is ended. Whereas when the end is not selected (S207; NO), the processing loops back to S201.

Specific Example

Figure 6:
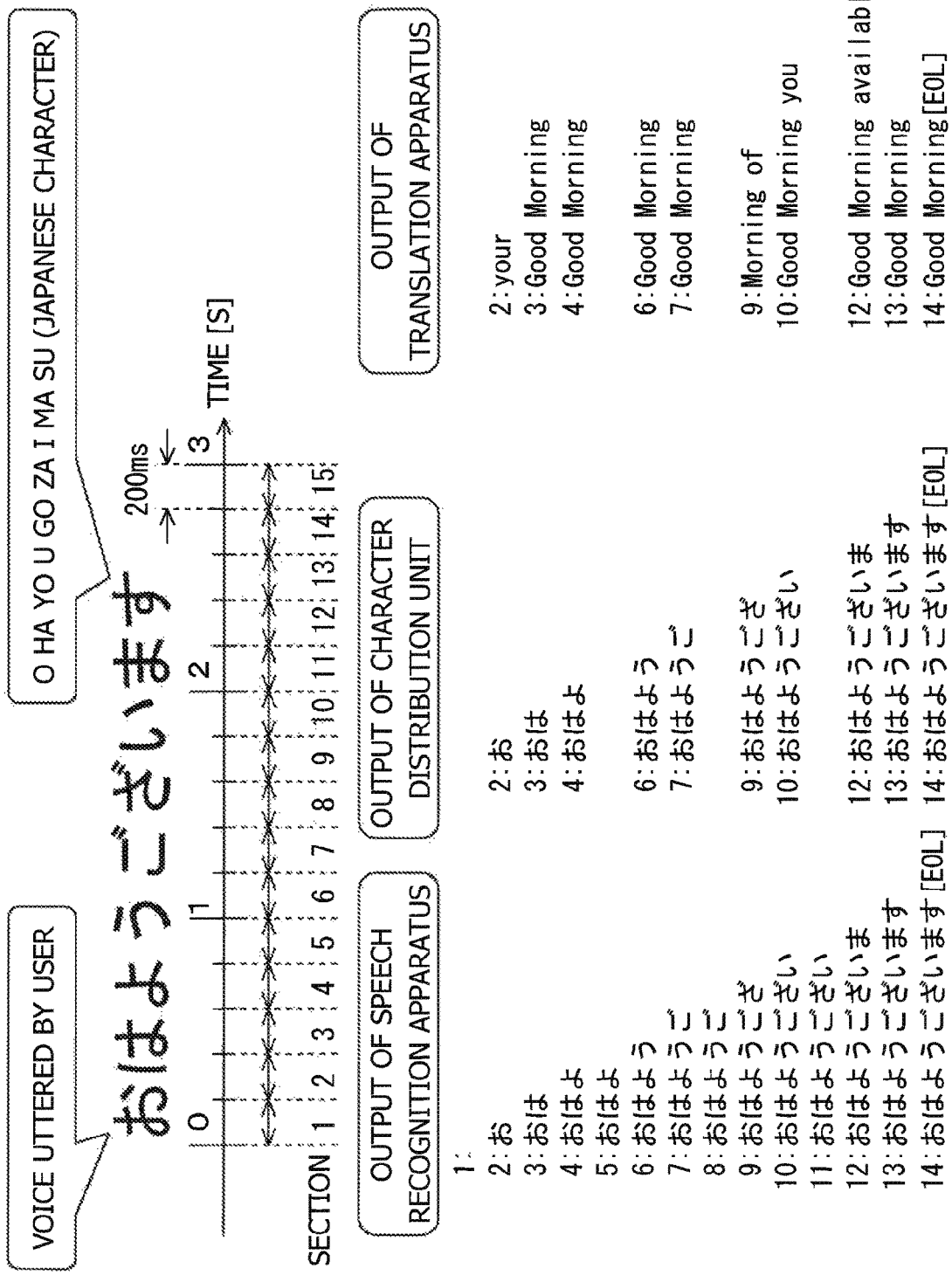
FIG. 6 is a diagram illustrating a specific example of an operation of the translation system according to the embodiment.

FIG. 6 is a diagram illustrating a specific example of the operation of the translation system according to the embodiment. Described herein is an example that the user utters a voice "O ha yo u go za i ma su (Good morning)" in about 2.5 seconds (up to time 2.5 s from time Os) toward a terminal equipment 100A. The usage language of the terminal equipment 100A is to be Japanese. The usage language of a terminal equipment 100B is to be English.

The voice input unit 106 of the terminal equipment 100A converts, into an electric signal, a part of "O" that is a phonemic fragment of "Ohayougozaimasu" and inputted in first 200 ms as a first section (up to time 0.2 s from time Os) as seen in FIG. 6, and transmits the electric signal to the speech recognition command issuing unit 108 (S101 in FIG. 4). The speech recognition command issuing unit 108 transmits the speech recognition command together with the received voice data and the information of the usage language to the speech recognition apparatus 200 (S102 in FIG. 4). The speech recognition apparatus 200 executes the speech recognition of the voice of the voice data. However, the speech recognition apparatus 200 is unable to convert the voice into the characters of Japanese as the usage language because of a part of "O" is the phonemic fragment of the voice of the voice data according to the speech recognition command. The speech recognition apparatus 200 transmits a mark [ ] not containing the character information as the speech recognition result to the terminal equipment 100A. The speech recognition result accepting unit 110 of the terminal equipment 100A, upon receiving the speech recognition result not containing the character information, finishes the process in the first section because of non-existence of the character information to be displayed (S104; NO in FIG. 4).

Next, the voice input unit 106 of the terminal equipment 100A converts, into the electric signals, apart of "o" being the phonemic fragment and a part of "ha" being another phonemic fragment, inputted in 200 ms defined as a second section, of the voice "Ohayougozaimasu", and transmits the electric signals to the speech recognition command issuing unit 108 (S101 in FIG. 4). The speech recognition command issuing unit 108 transmits the speech recognition command together with the received voice data and the information of the usage language to the speech recognition apparatus 200 (S102 in FIG. 4). The speech recognition apparatus 200 executes the speech recognition of the voice of the voice data as one set of voice data by joining the voice data of the first section and the voice data of the second section together according to the speech recognition command. Herein, the voice of the voice data is "O" and a part of "ha" being the phonemic fragment, and hence the voice is converted into Japanese character "O (Japanese character)" in the usage language. The speech recognition apparatus 200 transmits the character information "O (Japanese character)" as the speech recognition result to the terminal equipment 100A. The speech recognition result accepting unit 110 of the terminal equipment 100A, when receiving the character information "O (Japanese character)", transmits this character information to the character distribution unit 112 (S104; YES in FIG. 4). The character distribution unit 112 causes the display unit 102 to display the received speech recognition result "O (Japanese character)" (but may not cause the display unit 102 to display as described above). The character distribution unit 112 transmits the character information "O (Japanese character)" together with the information of the usage language by the multicast communication (S105 in FIG. 4).

On the other hand, the character accepting unit 114 of the terminal equipment 100B, which receives the character information "O (Japanese character)" together with the information of the usage language by the multicast communication, causes the display unit 102 to display the received character information "O (Japanese character)" (S202 in FIG. 5). The translation command issuing unit 116 generates the translation command for commanding the translation apparatus 300 to translate. The translation command issuing unit 116 transmits the information of the first language (Japanese) the character information "O (Japanese character)" and the information of the second language (English) together with the translation command to the translation apparatus 300. The translation apparatus 300 translates the character information "O (Japanese character)" in Japanese into English. Herein, the character information "O (Japanese character)" is to be translated into "your" in English. The translation apparatus 300 transmits the character information "your" as the translation result to the terminal equipment 100B. The translation result accepting unit 118 of the terminal equipment 100B gets the translation result "your" received from the translation apparatus 300 to be displayed in the vicinity of the character information "O (Japanese character)" (S206 in FIG. 5). The uttered voice can be thereby voice-recognized and translated at the interval of the predetermined time by phonemically fragmenting the uttered voice per predetermined time section.

Similarly, "OHA (Japanese character)", "OHAYO (Japanese character)" are outputted as the speech recognition result in the processes of the third and fourth sections, and respectively undergo the translation process. The speech recognition results are sequentially updated on the display units 102 of the terminal equipments 100A, 100B. The translation processing results are sequentially updated on the display units 102 of the terminal equipments 100A, 100B. The operation is applied to processes in sixth, seventh, ninth, tenth, twelfth and thirteenth sections.

The speech recognition result in the process of the fifth section is the same as in the process of the fourth section, and the translation process is not therefore carried out (S104; YES in FIG. 4). Hence, neither the speech recognition result nor the translation processing result is herein updated. The same is applied to the processes of the eighth and eleventh sections.

Next, the voice input unit 106 of the terminal equipment 100A converts, into the electric signal, a silent element after "Ohayougozaimasu (Japanese character)" inputted in 200 ms defined as the fourteenth section, and transmits the electric signal to the speech recognition command issuing unit 108 (S101 in FIG. 4). The speech recognition command issuing unit 108 transmits the speech recognition command together with the received voice data and the information of the usage language to the speech recognition apparatus 200 (S102 in FIG. 4). The speech recognition apparatus 200 executes the speech recognition of the voice of the voice data by joining the voice data of the first section through the voice data of the fourteenth section together into one set of voice data according to the speech recognition command. Herein, the voice of the voice data is "Ohayougozaimasu" is therefore converted into the characters "Ohayougozaimasu (Japanese character)" in Japanese as the usage language. The speech recognition apparatus 200 adds the control character "EOL" indicating the line feed to the silent element because of the voice data containing the silent element equal to or longer than the predetermined period. Note that EOL is capital letters (abbreviation) of "End of Line". The speech recognition apparatus 200 transmits the character information "Ohayougozaimasu (Japanese character) [EOL]" as the speech recognition result to the terminal equipment 100A. The speech recognition result accepting unit 110 of the terminal equipment 100A, when receiving the character information "Ohayougozaimasu (Japanese character)

[EOL]", transmits this character information to the character distribution unit 112 (S104; YES in FIG. 4). The character distribution unit 112 causes the display unit 102 to display the received speech recognition result "Ohayougozaimasu (Japanese character) [EOL]" (but may not cause the display unit 102 to display as described above). The speech recognition result is established due to containing the control character of the line feed. The character distribution unit 112 transmits the character information "Ohayougozaimasu (Japanese character) [EOL]" together with the information of the usage language by the multicast communication (S105 in FIG. 4).

On the other hand, the character accepting unit 114 of the terminal equipment 100B, which receives the character information "Ohayougozaimasu (Japanese character) [EOL]" by the multicast communication, causes the display unit 102 to display the received character information "Ohayougozaimasu (Japanese character) [EOL]" (S202 in FIG. 5). The translation command issuing unit 116 generates the translation command for commanding the translation apparatus 300 to translate. The translation command issuing unit 116 transmits the information of the first language (Japanese, the character information "O (Japanese character)" and the information of the second language (English) together with the translation command to the translation apparatus 300. The translation apparatus 300 translates the character information "Ohayougozaimasu (Japanese character) [EOL]" in Japanese into English. This character information is herein to be translated into "Good Morning [EOL]" in English. The control character remains as it is after the translation. The translation apparatus 300 transmits the character information "Good Morning [EOL]" as the translation result to the terminal equipment 100B. The translation result accepting unit 118 of the terminal equipment 100B gets the translation result "Good Morning [EOL]" received from the translation apparatus 300 to be displayed in the vicinity of the character information "Ohayougozaimasu (Japanese character) [EOL]" (S206 in FIG. 5). The control character is not displayed on the display unit 102. The translation result contains the control character of the line feed, and hence the speech recognition result is established.

Operation and Effect of Embodiment

In the terminal equipment 100A to which the voice is inputted, the voice-recognized characters are sequentially updated as the voices are inputted, and displayed on the display unit 102. In the terminal equipment 100B, the voice-recognized characters and the translation result of these characters being translated are sequentially updated as the voices are inputted to the terminal equipment 100A, and displayed on the display unit 102. With this operation, even in the midst of a speech uttered by the user of the terminal equipment 100A receiving the voice input, the speech is voice-recognized and undergoes the translation process. This operation enables the user of the terminal equipment 100B to understand a substantial content of the speech uttered by the user of the terminal equipment 100A before the user of the terminal equipment 100A finishes speaking by seeing the sequentially updated translation sentences. It may happen sometimes that the translation result becomes inaccurate due to the translation being made even in the midst of speaking, and the translation result gets, however, gradually accurate while speaking, resulting in no hindrance against substantially understanding the content. The user of the terminal equipment 100B is thereby enabled to start speaking immediately after the user of the terminal equipment 100A has finished speaking, whereby a conversation between speakers speaking the different languages can be smoothened. Similarly, the voice uttered toward the terminal equipment 100B by the user of the terminal equipment 100B is voice-recognized, and the characters being voice-recognized by the terminal equipment 100A and the translation result of translating these characters are sequentially updated and thus displayed. It is also feasible to speak to a multiplicity of persons using the different languages by transmitting the speech recognition result to the plurality of terminal equipments 100 in the way of utilizing the multicast communication. By being transmitted to other terminal equipments 100 before translating the voice-recognized character information, it follows that the respective terminal equipments 100 issue the translation commands matching with the terminal equipments 100, thereby enabling the respective terminal equipments 100 to make the translations into the usage languages of the individual terminal equipments 100.

A number of the terminal equipments 100 is herein instanced by "2", and three or more terminal equipments 100 may also, however, exist. Hereat, for example, there exist a first user using Japanese, a second user using English and a third user using Spanish, in which case Japanese spoken by the first user, English spoken by the second user with an English-Japanese translation, and Spanish spoken by the third user with a Spanish-Japanese translation are sequentially displayed on the terminal equipment 100 of the first user.

Modified Example 1

Herein, the speech recognition command issuing unit 108 of the terminal equipment 100 transmits the voice data per section together with the speech recognition command, and such a configuration may also, however, be available that the terminal equipment 100 joins the series of voice data, though being joined originally by the speech recognition apparatus 200, and the series of joined voice data for the speech recognition are transmitted together with the speech recognition command to the speech recognition apparatus 200. Hereat, a load on the speech recognition apparatus 200 can be reduced.

Modified Example 2

Herein, a modified example using a standard language will be described. In the voice input in FIG. 3, the terminal equipment 100 converts the voice into the character information of the accepted language, and transmits the character information toward another equipment. Herein, the voice is converted into the character information of the accepted language, further converted into the character information of the standard language, and transmitted toward another equipment.

Figure 7:
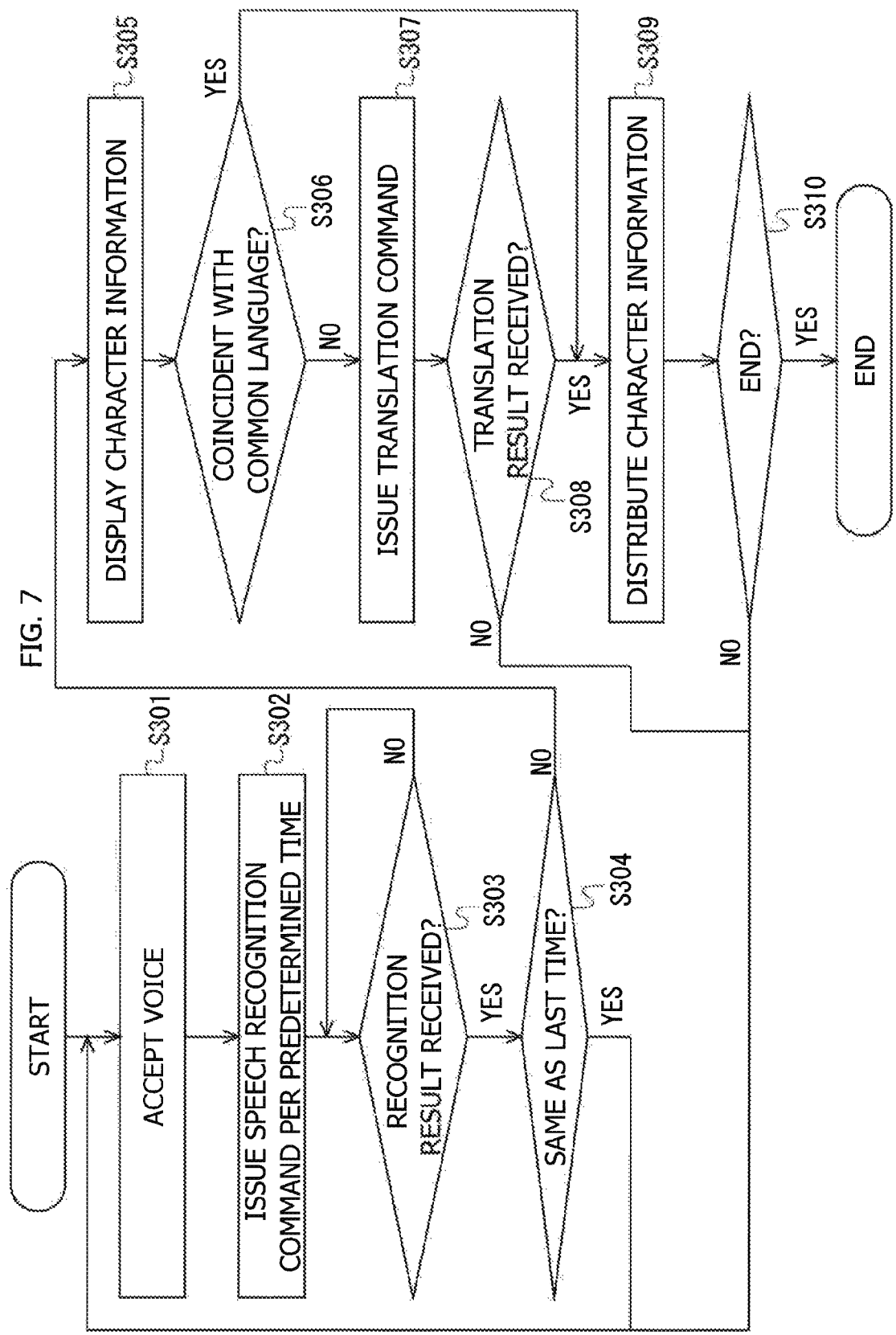
FIG. 7 is a flowchart of an operation flow of inputting the voice to the terminal equipment according to a modified example 1.

FIG. 7 is a flowchart illustrating an operation flow of the voice input on the terminal equipment according to a modified example 2. The terminal equipment 100 is used by the user. The user inputs the voice by making utterance toward the terminal equipment 100. For example, the operation flow in FIG. 7 is executed at the interval of predetermined time (e.g., 200 ms) equivalent to a length of one section of the voice input.

An operation in S301 through S303 is the same as the operation in S101 through S103 in FIG. 4. The repetitive explanations are herein omitted.

In S304, the speech recognition result accepting unit 110 compares the speech recognition result received this time with the speech recognition result received last time to be stored in the storage unit 104. When the speech recognition result received this time is the same as the speech recognition result received last time (S304; YES), the processing loops back to S301. This is because the processes from S305 onward are executed for the speech recognition result of the last time in this case, and hence there is no necessity for executing the same processes for the same speech recognition result. The same is applied to a case of the speech recognition result not containing the character information. It is because there is no necessity for executing the subsequent processes instanced by displaying when not containing the character information. Whereas when the speech recognition result received this time is different from the speech recognition result received last time (S304; NO), the speech recognition result accepting unit 110 transmits the speech recognition result to the character distribution unit 112, and the processing advances to S305.

In S305, the character distribution unit 112 receives the speech recognition result from the speech recognition result accepting unit 110. The character distribution unit 112 stores the received speech recognition result as the speech recognition result of this time in the storage unit 104. Hereafter, when a speech recognition result is newly stored, the speech recognition result of this time becomes the speech recognition result of the last time. The character distribution unit 112 causes the display unit 102 to display the received speech recognition result. Hereat, the character distribution unit 112, after erasing the speech recognition result displayed finally, displays the character information of the speech recognition result received this time. In other words, the speech recognition result to be displayed is updated. However, the character distribution unit 112, when the speech recognition result displayed finally contains the control character indicating the line feed, displays the character information of the speech recognition result received this time after performing the line feed without erasing the speech recognition result displayed finally. The speech recognition result contains the control character indicating the line feed, thereby establishing the speech recognition result with respect to the series of voice data.

In S306, the character distribution unit 112 acquires the information of the usage language of the terminal equipment 100 from the storage unit 104. The character distribution unit 112 further acquires information of the standard language used in common to other equipments on the LAN 500. The information of the standard language is stored beforehand in the storage unit 104. The character distribution unit 112 compares the information of the usage language of the self terminal equipment 100 with the information of the standard language, thus determining whether the usage language is coincident with the standard language. When the usage language of the self terminal equipment 100 is coincident with the standard language (S306; YES), the processing diverts to S309. In this case, the speech recognition result is not translated. Whereas when the usage language of the self terminal equipment 100 is different from the standard language (S306; NO), the processing advances to S307. The standard language is, e.g., English.

In S307, the character distribution unit 112 transmits, to the translation command issuing unit 116, the information of the standard language, the information of the usage language of the self terminal equipment 100 and the speech recognition result received this time. The translation command issuing unit 116 receives the information of the usage language (the first language) of the self terminal equipment 100, the speech recognition result received this time, and the information of the standard language (the second language) from the character distribution unit 112. The translation command issuing unit 116 generates (issues) the translation command for causing the translation apparatus 300 to translate, and transmits the translation command to the translation apparatus 300 via the communication unit 120. The translation process is a process of converting (translating) the character information of the first language into the character information of the second language, based on predetermined dictionaries and other equivalent resources. The translation command is transmitted to the translation apparatus 300 from the communication unit 120 via the network 400. The translation command is a command of commanding the translation apparatus 300 to translate the character information of the first language into the character information of the second language. The information of the first language, the character information, and the information of the second language are transmitted together with the translation command. An address of the terminal equipment 100 and an identifier for identifying the terminal equipment 100 may also be transmitted together with the translation command.

The translation apparatus 300 accepts the translation command, the information of the first language, the character information and the information of the second language from the terminal equipment 100. The translation apparatus 300, upon receiving the translation command, translates the character information of the first language into the second language according to the translation command. The translation apparatus 300 transmits the translated character information to the terminal equipment 100. The translation apparatus 300, when the character information contains the control character indicating the line feed, sets the post-translating character information to contain the control character.

In S308, the translation result accepting unit 118 determines whether a translation result is received from the translation apparatus 300 via the communication unit 120. When received (S308; YES), the processing advances to S309. Whereas when not received (S308; NO), the processing loops back to S301.

In S309, the translation result accepting unit 118 stores the received translation result in the storage unit 104. The translation result accepting unit 118 causes the display unit 102 to display the received translation result. The character distribution unit 112 transmits, based on the multicast communication, the received translation result and the information of the standard language toward other terminal equipments on the LAN 500 via the communication unit 120 by designating predetermined addresses. The standard language is a language of the character information of the translation result. When coincident with the standard language in S306 (S306; YES), the character distribution unit 112 transmits, based on the multicast communication, the received speech recognition result and the information of the standard language toward other terminal equipments on the LAN 500 via the communication unit 120 by designating predetermined addresses.

In S310, in an application for attaining an operation of the present operation flow, the terminal equipment 100 determines whether an end of the application is selected. The end of the application includes power-OFF of the self terminal equipment 100. When the end is selected (S310; YES), the processing of the operation flow is ended. Whereas when the end is not selected (S310; NO), the processing loops back to S301.

According to the modified example 2, the terminal equipment 100 translates the voice spoken in the first language temporarily into the standard language like English, and transmits the translated standard language toward the other equipments on the LAN 500. The character information of the standard language is translated into the usage languages of other equipments and displayed on other equipments receiving the character information of the standard language in accordance with the operation flow in FIG. 5. Even when the translation accuracy from the first language into the second language is low, the translation apparatus 300 is thereby enabled to increase the translation accuracy from the first language into the second language consequently as far as the translation accuracy from the first language into the standard language and further from the standard language into the second language is high. The translation accuracy from any language into any language can be increased by setting universal language like English and French as the standard languages. This is because the translation accuracy between any universal languages by the translation apparatus 300 is generally considered high. Even when the translation apparatus for translating the first language into the second language does not exist, the translation from the first language into the second language can be attained as far as there exists the translation apparatus for translating the first language into the standard language and further translating the standard language into the second language. Even when the translation apparatuses are not prepared among all the languages, the translations among all the languages can be attained simply by preparing the translation apparatus between the standard languages.

Modified Example 3

Described herein is a modified example of displaying the translation result on the equipment with the voice being inputted. The explanations of the common components and operations to those in the examples described above are omitted.

<Configuration of Terminal Equipment>

Figure 8:
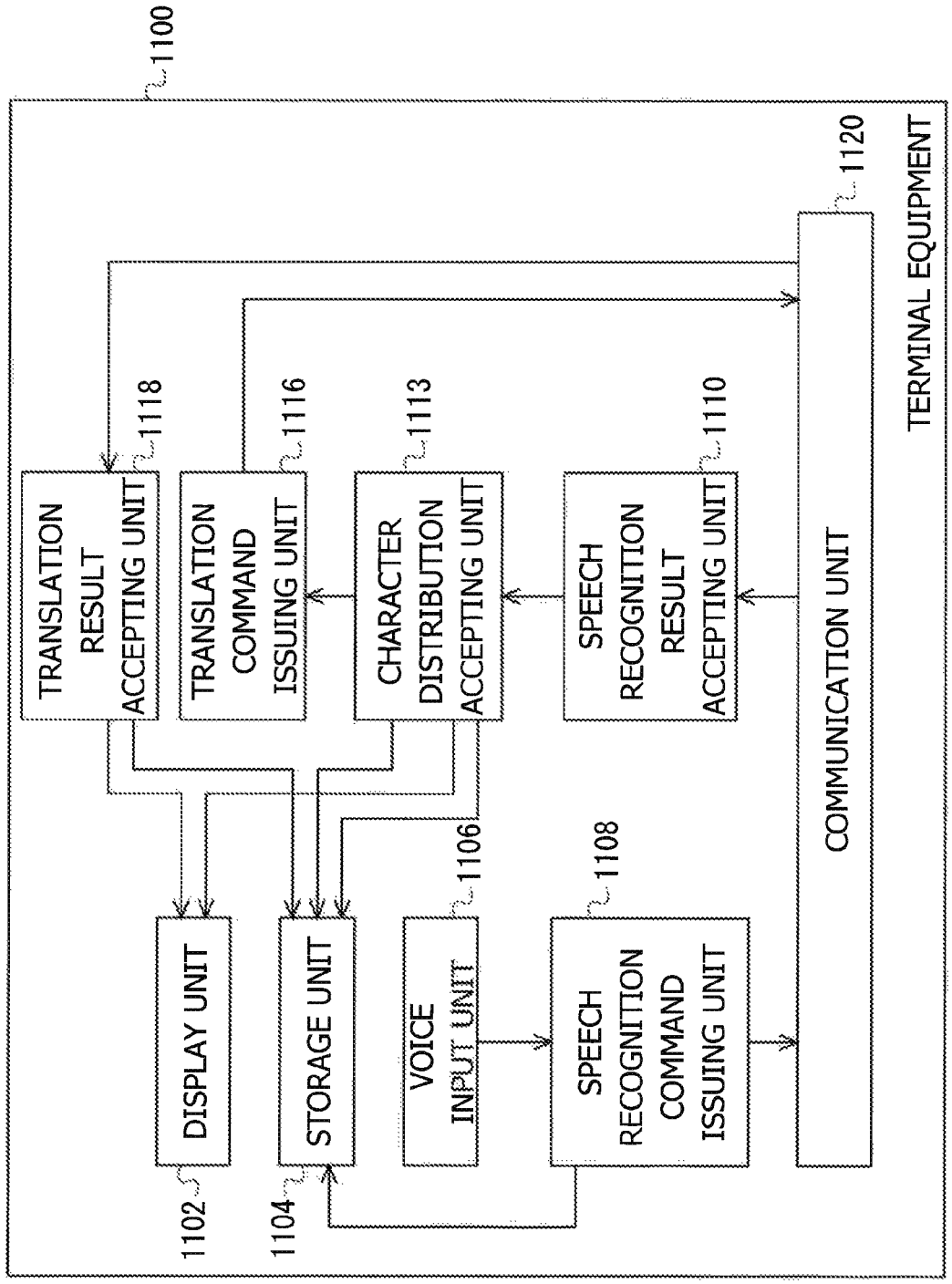
FIG. 8 is a diagram illustrating an example of function blocks of the terminal equipment according to a modified example 3.

FIG. 8 is a diagram illustrating an example of function blocks of a terminal equipment according to a modified example 3. A terminal equipment 1100 includes a display unit 1102, a storage unit 1104, a voice input unit 1106, a speech recognition command issuing unit 1108, a speech recognition result accepting unit 1110, a character distribution accepting unit 1113, a translation command issuing unit 1116, a translation result accepting unit 1118, and a communication unit 1120.

The display unit 1102 is the same as the display unit 102 of the terminal equipment 100. The storage unit 1104 is the same as the storage unit 104 of the terminal equipment 100. The voice input unit 1106 is the same as the voice input unit 106 of the terminal equipment 100. The speech recognition command issuing unit 1108 is the same as the speech recognition command issuing unit 108 of the terminal equipment 100. The speech recognition result accepting unit 1110 is the same as the speech recognition result accepting unit 110 of the terminal equipment 100.

The character distribution accepting unit 1113 receives the speech recognition result from the speech recognition result accepting unit 1110. The character distribution accepting unit 1113 stores the received speech recognition result in the storage unit 1104. The character distribution accepting unit 1113 causes the display unit 1102 to display the received speech recognition result. The character distribution accepting unit 1113 acquires the information of the usage language of the terminal equipment 1100 from the storage unit 1104. The character distribution accepting unit 1113 stores the received speech recognition result and the information of the usage language in the storage unit 1104. The character distribution accepting unit 1113 transmits the information of the usage language of the self equipment, the information of the language of a translation destination equipment and the speech recognition result to the translation command issuing unit 1116.

The translation command issuing unit 1116 is the same as the translation command issuing unit 116 of the terminal equipment 100. The translation result accepting unit 1118 is the same as the translation result accepting unit 118 of the terminal equipment 100. The communication unit 1120 is the same as the communication unit 120 of the terminal equipment 100.

Operation Example of Modified Example 3

Figure 9:
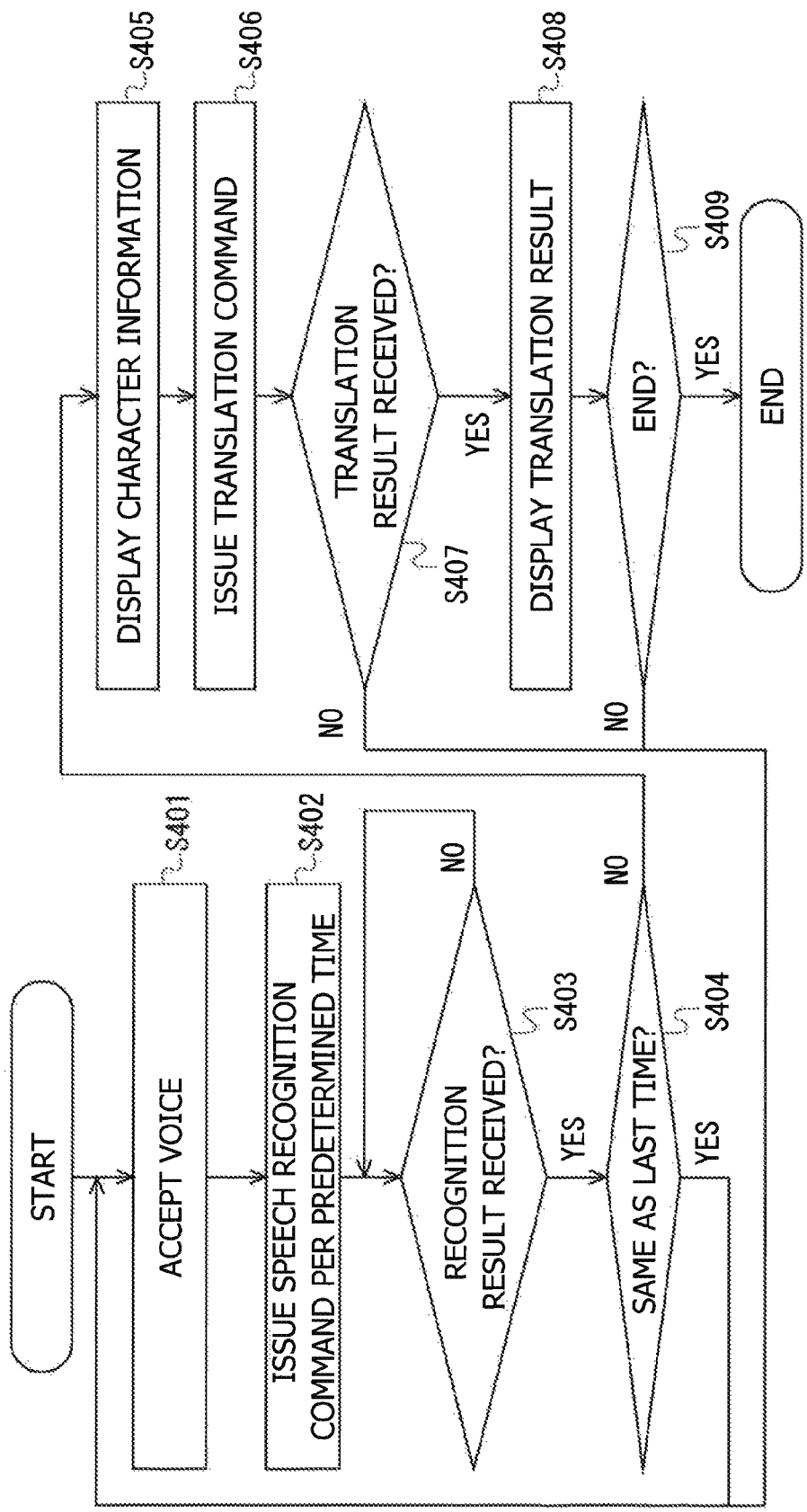
FIG. 9 is a flowchart of an operation flow of inputting the voice to the terminal equipment according to a modified example 3.

FIG. 9 is a flowchart illustrating an example of an operation flow of the voice input to the terminal equipment according to a modified example 3. The terminal equipment 1100 is used by the user. The user inputs the voice uttered toward the terminal equipment 1100. The operation flow in FIG. 9 is executed at an interval of a predetermined time (e.g., 200 ms) equivalent to a length of one section of the voice input.

An operation in S401 through S403 is the same as the operation in S101 through S103 in FIG. 4. The repetitive explanations are herein omitted.

In S404, the speech recognition result accepting unit 1110 compares the speech recognition result received this time with the speech recognition result received last time to be stored in the storage unit 1104. When the speech recognition result received this time is the same as the speech recognition result received last time (S404; YES), the processing loops back to S401. This is because the processes from S405 onward are executed for the speech recognition result of the last time in this case, and hence there is no necessity for executing the same processes for the same speech recognition result. The same is applied to a case of the speech recognition result not containing the character information. It is because there is no necessity for executing the subsequent processes instanced by displaying when not containing the character information. Whereas when the speech recognition result received this time is different from the speech recognition result received last time (S404; NO), the speech recognition result accepting unit 1110 transmits the speech recognition result to the character distribution accepting unit 1113, and the processing advances to S405.

In S405, the character distribution accepting unit 1113 receives the speech recognition result from the speech recognition result accepting unit 1110. The character distribution accepting unit 1113 stores the received speech recognition result as the speech recognition result of this time in the storage unit 1104. Hereafter, when a speech recognition result is newly stored, the speech recognition result of this time becomes the speech recognition result of the last time. The character distribution accepting unit 1113 causes the display unit 1102 to display the received speech recognition result. Hereat, the character distribution accepting unit 1113, after erasing the speech recognition result displayed finally, displays the character information of the speech recognition result received this time. In other words, the speech recognition result to be displayed is updated. However, the character distribution accepting unit 1113, when the speech recognition result displayed finally contains the control character indicating the line feed, displays the character information of the speech recognition result received this time after performing the line feed without erasing the speech recognition result displayed finally. The speech recognition result contains the control character indicating the line feed, thereby establishing the speech recognition result with respect to the series of voice data.

In S406, the character distribution accepting unit 1113 transmits, to the translation command issuing unit 1116, the information of the standard language, the information of the usage language of the self terminal equipment 1100 and the speech recognition result received this time. The translation command issuing unit 1116 receives the information of the usage language (the first language) of the self terminal equipment 1100, the speech recognition result received this time, and the information of the language (the second language) of the translation destination equipment from the character distribution accepting unit 1113. The translation command issuing unit 1116 generates (issues) the translation command for causing the translation apparatus 300 to translate, and transmits the translation command to the translation apparatus 300 via the communication unit 1120. The translation process is a process of converting (translating) the character information of the first language into the character information of the second language, based on predetermined dictionaries and other equivalent resources. The translation command is transmitted to the translation apparatus 300 from the communication unit 1120 via the network 400. The translation command is a command of commanding the translation apparatus 300 to translate the character information of the first language into the character information of the second language. The information of the first language, the character information, and the information of the second language are transmitted together with the translation command. An address of the terminal equipment 1100 and an identifier for identifying the terminal equipment 1100 may also be transmitted together with the translation command.

The translation apparatus 300 accepts the translation command, the information of the first language, the character information and the information of the second language from the terminal equipment 1100. The translation apparatus 300, upon receiving the translation command, translates the character information of the first language into the second language according to the translation command. The translation apparatus 300 transmits the translated character information to the terminal equipment 1100. The translation apparatus 300, when the character information contains the control character indicating the line feed, sets the post-translating character information to contain the control character.

In S407, the translation result accepting unit 1118 determines whether the translation result is received from the translation apparatus 300 via the communication unit 1120. When receiving the translation result (S407; YES), the processing advances to S408. Whereas when not receiving the translation result (S407; NO), the processing loops back to S401.

In S408, the translation result accepting unit 1118 stores the received translation result in the storage unit 1104. The translation result accepting unit 1118 causes the display unit 1102 to display the received translation result. The translation result is displayed in the vicinity of the character information displayed in S405. Displaying in the vicinity thereof facilitates a comparison between the translation result and the pre-translating character information, which comparison is made by the user of the terminal equipment 1100. Hereat, the translation result accepting unit 1118 displays the translation result received this time after erasing the translation result displayed finally in S408. In other words, the translation result to be displayed is updated. However, the translation result accepting unit 1118, when the translation result displayed finally in S408 contains the control character indicating the line feed, displays the translation result received this time after performing the line feed without erasing the translation result displayed finally. When the character information contains the control character indicating the line feed, the character information to be displayed is not updated.

In S409, in an application for attaining an operation of the present operation flow, the terminal equipment 1100 determines whether an end of the application is selected. The end of the application includes power-OFF of the self terminal equipment 1100. When the end is selected (S409; YES), the processing of the operation flow is ended. Whereas when the end is not selected (S409; NO), the processing loops back to S401.

Herein, the language of the translation destination equipment is set to one language as the second language, and two or more languages may also, however, exist as the languages of the translation destination equipment. Hereat, the translation command issuing unit 1116 issues a plurality of translation commands for making the translations into a plurality of languages. The translation result accepting unit 1118 causes the display unit 1102 to display the translation results of the plural languages. According to the modified example 3, the character information of the inputted language and the character information of the translated language are displayed on the terminal equipment 1100 by inputting the voice in one language. For example, a digital signage and other equivalent equipments installed at stations and other equivalent places are set as the terminal equipments 1100, in which case broadcasting at the stations is converted into the character information, further translated into other languages in real time and displayed on the display units.

The present invention can be modified and combined within the scope that does not deviate from the gist of the present invention without being limited to the embodiments discussed above.

<Non-Transitory Computer-Readable Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Components instanced by a CPU, a memory and other equivalent components configuring the computer are provided within the recording medium described above, and the CPU may be made to run the program.

Among these non-transitory recording mediums, the mediums removable from the computer and other equivalent apparatuses are exemplified by a flexible disc, a magneto-optic disc, a CD-ROM, a CD-R/W, a DVD, a DAT, an 8 mm tape, and a memory card.

A hard disc, a ROM (Read-Only Memory) and other equivalent recording mediums are given as the non-transitory recording mediums fixed within the computer and other equivalent apparatuses.

What is claimed is:

1. A speech recognition and translation terminal comprising:
    a processor, a storage unit, and a display, the processor being programmed with:
    a voice input unit to accept an input of a voice;
    a speech recognition command unit to command a speech recognition unit to convert voices of joined voice data, acquired by the voice input unit joining voice data of the voice accepted by the voice input unit to voice data of voice accepted previously, into character information of a first language at an interval of predetermined time;
    a character transmission unit to determine whether to transmit first character information of the first language toward another terminal equipment whenever receiving the first character information of the first language converted by the speech recognition unit;
    a translation command unit to command a translation unit to translate second character information of a second language into the first language whenever receiving the second character information of the second language from another terminal equipment; and
    the display displaying translation of the second character information in the first language translated by the translation unit,
    wherein the voice data contain a series of serial numbers,
    the joined voice data are generated by using the serial numbers contained in the voice data,
    the speech recognition unit, when the voice contains a silence continuing for a predetermined time, converts the voice into a control character indicating a line feed,
    the character transmission unit, when the first character information of the first language is the same as first character information received a previous time, which is stored in the storage unit, does not transmit the first character information of the first language toward another terminal equipment.

2. A speech recognition and translation method by which a processor, programmed by instructions from a storage unit, executes:
    accepting an input of a voice;
    converting voices of joined voice data, acquired by joining voice data of the accepted voice to voice data of voice accepted previously, into character information of a first language at an interval of predetermined time;
    determining whether to transmit first character information of the first language toward a terminal equipment whenever receiving the first character information of the first language converted by a speech recognition unit;
    commanding a translation unit to translate second character information of a second language into the first language whenever receiving the second character information of the second language from the terminal equipment; and
    displaying on a display translation of the second character information in the first language translated by the translation,
    wherein the voice data contain a series of serial numbers,
    the joined voice data are generated by using the serial numbers contained in the voice data,
    when the voice contains a silence continuing for a predetermined time, converting the voice into a control character indicating a line feed,
    when the first character information of the first language is the same as first character information received a previous time, which is stored in the storage unit, does not transmit the first character information of the first language toward another terminal equipment.

3. A non-transitory computer readable medium storing a speech recognition and translation program compiled to make a processor, programmed by instructions from the non-transitory computer readable medium, execute:
    accepting an input of a voice;
    commanding a speech recognition unit to convert voices of joined voice data, acquired by joining voice data of the accepted voice to voice data of voice accepted previously, into character information of a first language at an interval of predetermined time;
    determining whether to transmit first character information of the first language toward a terminal equipment whenever receiving the first character information of the first language converted by the speech recognition unit;
    commanding a translation unit to translate second character information of a second language into the first language whenever receiving the second character information of the second language from the terminal equipment; and
    displaying translation of the second character information in the first language translated by the translation unit on a display,
    wherein the voice data contain a series of serial numbers,
    the joined voice data are generated by using the serial numbers contained in the voice data,
    when the voice contains a silence continuing for a predetermined time, converting the voice into a control character indicating a line feed,
    when the first character information of the first language is the same as first character information received a previous time, which is stored in the non-transitory computer readable medium, does not transmit the first character information of the first language toward another terminal equipment.

4. The speech recognition and translation terminal according to claim 1, wherein the display displays the translation of the second character information in the first language together with the second character information of the second language.

5. The speech recognition and translation method by which the processor according to claim 2, executes:
    displaying the translation of the second character information in the first language together with the second character information of the second language.

6. The non-transitory computer readable medium storing a translation program compiled to make the processor according to claim 3, executes:

displaying the translation of the second character information in the first language together with the second character information of the second language.

\* \* \* \* \*